United States Patent
Nicholls et al.

(10) Patent No.: US 9,108,741 B2
(45) Date of Patent: Aug. 18, 2015

(54) HELICOPTER SYSTEM AND METHOD FOR INTEGRATING COLLECTIVE FLIGHT DIRECTOR CUES

(71) Applicant: HONEYWELL INTERNATIONAL INC., Morristown, NJ (US)

(72) Inventors: James Alexander Nicholls, Glendale, AZ (US); Patricia May Ververs, Ellicott City, MD (US); Gang He, Morristown, NJ (US); Marc Lajeunesse, Lafayette, NJ (US); Mark Sutter, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 77 days.

(21) Appl. No.: 14/021,046

(22) Filed: Sep. 9, 2013

(65) Prior Publication Data

US 2015/0073628 A1    Mar. 12, 2015

(51) Int. Cl.
*B64D 45/00* (2006.01)
*G01C 23/00* (2006.01)

(52) U.S. Cl.
CPC .............. *B64D 45/00* (2013.01); *G01C 23/005* (2013.01)

(58) Field of Classification Search
CPC .... G05D 1/0669; G01C 23/005; G01C 23/00; G02B 2027/0141; G02B 27/01; H01M 2/18
USPC .............. 701/14, 3, 4, 16, 301, 302, 431; 340/972, 975, 979, 973, 976; 345/619; 359/630; 73/178 T
See application file for complete search history.

(56) References Cited

U.S. PATENT DOCUMENTS

| | | | |
|---|---|---|---|
| 3,916,688 A | 11/1975 | Dendy et al. | |
| 3,967,236 A | 6/1976 | Dietrich | |
| 5,797,562 A | 8/1998 | Wyatt | |
| 6,028,536 A * | 2/2000 | Voulgaris | 340/975 |
| 6,112,141 A | 8/2000 | Briffe et al. | |
| 6,469,640 B2 | 10/2002 | Wyatt | |
| 6,798,423 B2 * | 9/2004 | Wilkins et al. | 345/618 |
| 7,382,288 B1 * | 6/2008 | Wilson et al. | 340/972 |
| 7,463,954 B1 | 12/2008 | He | |
| 7,508,322 B1 | 3/2009 | Krenz et al. | |
| 8,295,997 B2 | 10/2012 | De Bono et al. | |
| 8,706,388 B2 * | 4/2014 | Pschierer et al. | 701/120 |
| 2005/0007386 A1 * | 1/2005 | Berson et al. | 345/633 |
| 2005/0042094 A1 | 2/2005 | Occhiato et al. | |
| 2007/0164167 A1 * | 7/2007 | Bachelder et al. | 244/220 |
| 2008/0252489 A1 * | 10/2008 | Naimer et al. | 340/971 |
| 2009/0138142 A1 | 5/2009 | Still et al. | |
| 2009/0157287 A1 * | 6/2009 | Shafaat et al. | 701/120 |
| 2009/0201177 A1 | 8/2009 | Soler | |
| 2009/0207048 A1 * | 8/2009 | He et al. | 340/973 |
| 2010/0194602 A1 * | 8/2010 | Engels et al. | 340/979 |

FOREIGN PATENT DOCUMENTS

EP    0119723 A2    9/1984

OTHER PUBLICATIONS

EP Extended Search Report for Application 14181488.9 dated Mar. 11, 2015.

* cited by examiner

*Primary Examiner* — Marthe Marc-Coleman
(74) *Attorney, Agent, or Firm* — Ingrassia Fisher & Lorenz, P.C.

(57) ABSTRACT

A system and method are provided for integrating and displaying the collective cue and the pitch and roll cue of a helicopter display with a flight path marker providing a moving reference showing the aircraft flight path.

20 Claims, 6 Drawing Sheets

HELICOPTER SYSTEM AND METHOD FOR INTEGRATING COLLECTIVE FLIGHT DIRECTOR CUES

TECHNICAL FIELD

The exemplary embodiments described herein generally relates to helicopter aviation and more particularly to the display of cues to the pilot for flying the helicopter.

BACKGROUND

Helicopter flying differs from fixed wing aircraft with significantly more vertical movement and dynamics. As such, representing cues for helicopter operation, for example, a pitch and roll cue and a collective cue, on a typical synthetic vision system (SVS) display presents more issues in comparison to the fixed wing aircraft.

Airplanes and helicopters commonly integrate a function referred to as a flight director which provides guidance to the pilot regarding how to manipulate the aircraft controls to align the aircraft with a path that has been selected using the aircraft navigation system.

Helicopter flight directors have traditionally used separate cues to provide guidance for the collective, pitch and roll control axes of the aircraft. The cues are displayed as markers that move with respect to a fixed reference point for each axis of control. The collective cue is represented as a symbol that is representative of a collective control. The symbol moves up and down with respect to, for example, a pair of fixed triangles which provides the reference point. The pilot is responsible to move the collective control up or down to place the collective cue symbol between the two triangles. Similar behavior also applies to the pitch and roll axes, where a fixed reference marker is provided and the pilot is responsible for aligning the cue with the reference markers by maneuvering the aircraft in the corresponding axis.

A known implementation for the flight director cues in the pitch and roll axes provides a "single cue" format which integrates the pitch and roll cues by using rotation of the cue to command roll axis movement and up and down movement to command pitch axis control. This symbology is used in both fixed and rotary wing aircraft. Helicopters, with their unique ability to move in the vertical axis require an additional cue to provide guidance in that axis.

Prior implementations of SVS and flight path marker (FPM) functionality in fixed wing aircraft have integrated the pitch and roll flight director (FD) cues with the FPM by using functionality similar to a single cue FD symbology.

Accordingly, it is desirable to provide a system and method of integrating displayed cues for display to the pilot for flying the helicopter. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for integrating displayed cues for display to the pilot for flying a helicopter.

In an exemplary embodiment, a display for an aircraft, the aircraft having flight parameters and a collective control, the display having a plurality of icons displayed thereon, the icons comprise a reference icon indicating a direction of the aircraft, the position on the display of the reference icon comprising a first state or a second state, the position fixed on the display in the second state, and the position on the display being responsive to the aircraft flight parameters in the first state; and a collective cue whose movement on the display is responsive to the collective control in the second state, and movement of the reference icon and the collective control in the first state.

In another exemplary embodiment, a method for displaying a plurality of icons on a display for an aircraft, the aircraft having flight parameters and a collective control, comprises displaying a reference icon indicating a direction of the aircraft, the position on the display of the reference icon comprising a first state or a second state, the position fixed on the display in the second state, and the position on the display being responsive to the aircraft flight parameters in the first state; and displaying a collective cue whose movement on the display is responsive to the collective control in the second state, and movement of the reference icon and the collective control in the first state.

In yet another exemplary embodiment, in a system for an aircraft, the aircraft having flight parameters and a collective control providing an output, the system comprising a display configured to display both a reference icon and a collective cue, wherein, the position on the display of the reference icon comprising a first state or a second state, the position fixed on the display in the second state, and the position on the display being responsive to the aircraft flight parameters in the first state; and movement of the collective cue on the display is responsive to the collective control in the second state, and movement of the reference icon and the collective control in the first state.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to flight management systems adapted for indicating, on a display device associated with an aircraft, whether the aircraft is within the designated criteria for a desired flight path.

The mapping methods described herein may be used with a variety of aircraft, such as planes and helicopters. The aviation environment is described herein as the exemplary embodiment and may include navigation from point to point or approach and landing at an airport. Generally a lateral view display is presented in conjunction with the vertical view presented herein. Various types of maps may be used for display on the lateral view, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries, etc).

Alternate embodiments of the present invention to those described below may utilize whatever navigation system signals are available, for example a ground based navigational system, a GPS navigation aid, a flight management system, and an inertial navigation system, to dynamically calibrate and determine a precise course.

The exemplary embodiments described herein relate to a graphical display of cues for control of the collective or vertical axis of a vertical lift aircraft such as a helicopter. Traditional collective cues have been displayed against a fixed scale. When displayed with respect to a flight path vector on a HUD, SVS, or EVS display, the location of the pitch and roll cues can change significantly as the flight path vector moves. If the collective cue is displayed against a fixed scale in the manner of a traditional collective cue, this can result in a large scan distance for the pilot to observe both the collective, pitch and roll cues. In accordance with the exemplary embodiments, and in a first state of two states, the graphical implementation of the collective cue allows the vertical axis cues to also be displayed relative to the flight path vector and facilitates the pilot's visual scan remaining focused around the flight path vector. In a second state, for example when flight parameters exceed a threshold or when chosen by the pilot, the collective cue is displayed with respect to a fixed position and the collective cue movement is in response thereto by the collective control. In addition, when flight parameters indicate a transition condition, the cues associated with the state one will fade out and cues associated with state two will fade in (or vice versa) at their respective positions. Fading in or out means increasing or decreasing in intensity and transparency.

Figure 1:
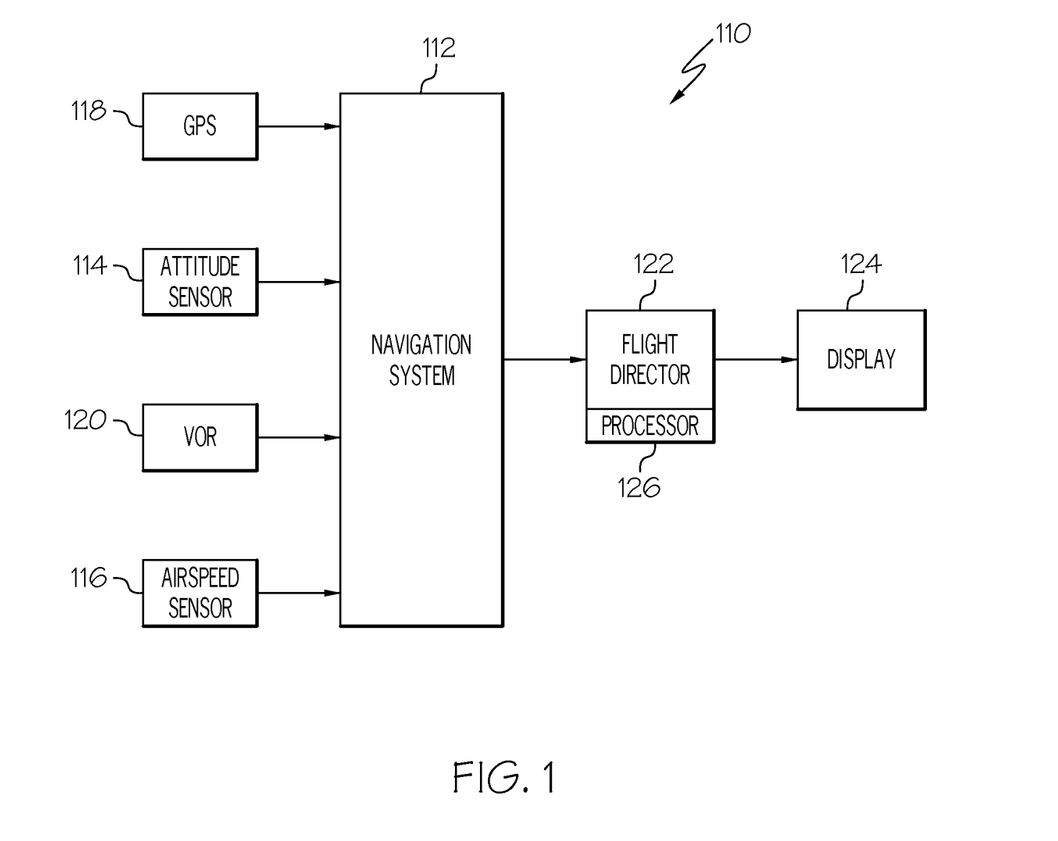
FIG. 1 is a block diagram of a known display system suitable for use in a helicopter in accordance with the exemplary embodiments described herein.

FIG. 1 is a simplified functional block diagram illustrating a display system 110 for displaying images of flight cues to a pilot on a helicopter display. It should be understood that FIG. 1 is a simplified representation of a display system 110 for purposes of explanation and ease of description, and FIG. 1 is not intended to limit the application or scope of the subject matter in any way. In practice, the display system 110 and/or helicopter will include numerous other devices and components for providing additional functions and features, as will be appreciated in the art.

Display system 110 includes multiple components each of which may be configured for mounting to a helicopter. In some embodiments, display system 110 may be a self-contained system such that each of the components described below are contained in a single housing and are dedicated exclusively to serving the functions of display system 110, while in other embodiments, the various components described below may be standalone components or they may be components that are used as part of other systems and which are configured to be used as a shared resource between such other systems and display system 110.

In the embodiment illustrated in FIG. 1, display system 110 includes a navigation system 112 receiving signals from an attitude sensor 114, an airspeed sensor 116, and navigational position locators including, for example, a global positioning system (GPS) 118 and a VHF omnidirectional radio range system (VOR) 120. The navigational system 112 provides an output to a flight director 122 which provides an output to a display 124. In other embodiments, system 110 may include either additional or fewer components.

In some embodiments, the system 110 may operate fully or partially integrated into an enhanced vision system (not shown), or a combined vision system (not shown) when the enhanced vision system is used together with a SVS (not shown).

The navigation system 112 of the exemplary embodiment is configured to determine the position of the helicopter with respect to the surface of the earth. Such a navigational position locator 118, 120 may also include, for example but not limited to, a global navigation satellite system (not shown) or an inertial navigation system (not shown). The navigation system 112 receives course, speed, rate of descent, and other inputs relating to the helicopter's heading, altitude and attitude and is configured to provide the output to the flight director 122 in response thereto. Geographic data (high integrity) may be positioned by a combination of a GPS 118 (with or without wide area augmentation system) and an inertial reference system (not shown).

In accordance with the exemplary embodiments, the flight director 122 computes commands for use by either the pilot or autopilot to maneuver the aircraft control system so that the aircraft will capture and track the path that has been selected in the aircraft navigation system. The flight director will compute commands for each axis of aircraft control, for example, pitch, roll, and collective. These commands are sent to the display system 124, where cues are rendered using two or three dimensional graphical objects for display to the pilot.

The display 124 is configured to provide the enhanced images to the pilot. In accordance with an exemplary embodiment, the display 124 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 124 additionally may be implemented as a panel mounted display, a HUD (head-up display) projection, or any one of numerous known technologies. It is additionally noted that the display 124 may be configured as any one of numerous types of helicopter flight deck displays. For example, it may be configured as a multi-function display, a horizontal situation indicator, or a vertical situation indicator. In the depicted embodiment, however, the display 124 is configured as a primary flight display (PFD). Display 124 is configured to display any type of image including, but not limited to, graphics and text.

A processor 126 may be any type of computer, computer system, microprocessor, collection of logic devices, or any other analog or digital circuitry within the flight director 122 that is configured to calculate, and/or to perform algorithms, and/or to execute software applications, and/or to execute sub-routines, and/or to be loaded with and to execute any type of computer program. Processor 126 may comprise a single processor or a plurality of processors acting in concert. In some embodiments, processor 126 may be dedicated for use exclusively with the flight director 122 while in other embodiments processor 126 may be shared with other systems on board the helicopter. In still other embodiments, processor 126 may be integrated into any of the other components of system 110.

Being communicatively and/or operatively coupled with the flight director 122 provides processor 126 with a pathway for the receipt and transmission of signals, commands, instructions, and interrogations to and from each of the other components. Processor 126 is configured, e.g., loaded with and being capable of executing suitable computer code, software and/or applications to interact with and to coordinate with each of the other components of display system 110 for the purpose of providing icons corresponding to the cues described hereinafter.

In operation, the processor 126 is configured to process data provided to the flight director of flight status data for the host helicopter. In this regard, the sources of flight status data generate, measure, and/or provide different types of data related to the operational status of the host helicopter, the environment in which the host helicopter is operating, flight parameters, and the like. In practice, the sources of flight status data may be realized using line replaceable units (LRUs), transducers, accelerometers, instruments, sensors, and other well-known devices. The data provided by the sources of flight status data may include, for example and without limitation: airspeed data; groundspeed data; altitude data; attitude data, including pitch data and roll data; yaw data; geographic position data (high integrity), such as a combination of GPS (wide area augmentation system) and inertial reference system data; time/date information; heading information; weather information; flight path data; track data; radar altitude data; geometric altitude data; wind speed data; and wind direction data.

It should be understood that FIG. 1 is a simplified representation of the display system 110 for purposes of explanation and ease of description, and FIG. 1 is not intended to limit the application or scope of the subject matter in any way. In practice, the display system 110 and/or helicopter (not shown) will include numerous other devices and components for providing additional functions and features, as will be appreciated in the art.

The display symbology described herein uses the commands for the collective control axis that are computed by the flight director and displays those commands to the pilot in a manner that integrates the collective control cues with the flight path vector and the pitch and roll cues.

In helicopters, the pitch and collective axes of control are highly related in that the two axes of control work together to control aircraft vertical path and speed. In accordance with the exemplary embodiments described herein, a flight path marker (FPM), providing a moving reference showing the aircraft flight path, is integrated with collective and pitch flight director (FD) cues.

Figure 2:
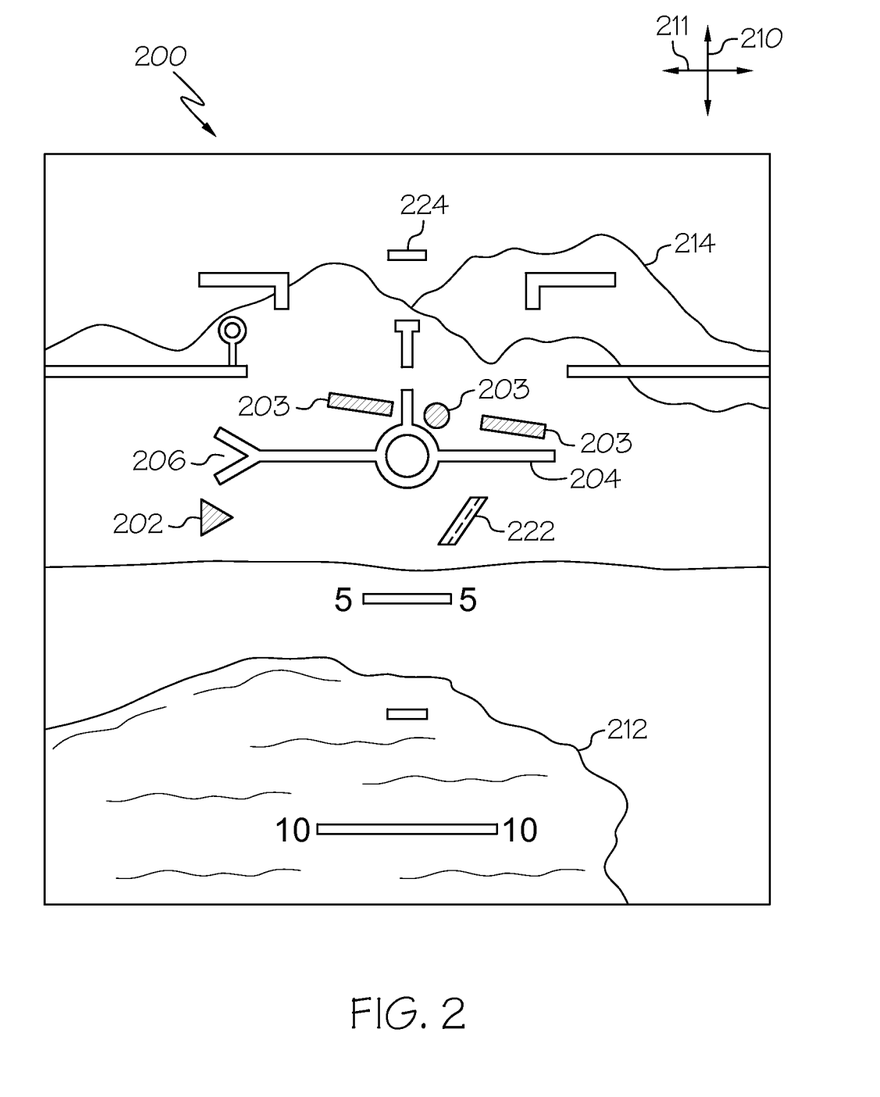
FIG. 2 is a simulated image of a flight environment including cues generated in accordance with a first exemplary embodiment.

Referring to FIG. 2 and in accordance with the exemplary embodiments described herein, a collective cue 202, shown as a triangle, moves up and down (vertical axis 210) with respect to a reference icon 204. There are two states for this exemplary embodiment. A first state describes the helicopter in flight with a forward airspeed, while a second state describes the helicopter at a slow airspeed or hovering.

In the first state, the reference icon 204 (which conventionally may be referred to as a flight path marker) is used to indicate the actual aircraft path through space. When used with an SVS, EVS, or HUD display system, the reference icon 204 displays the current aircraft flight path trajectory. If the reference icon 204 is aligned with a runway 222 or other landing surface, the aircraft will arrive at that point. In the illustrated embodiment of this invention, the reference icon 204 includes a chevron icon 206 which provides a reference point for the collective cue 202. The collective FD guidance would be satisfied when the triangle of the collective cue 202 is within the chevron icon 206. While a triangle 202 and chevron icon 206 as described are preferred, other implementations would be possible with a marker of another shape that moves up and down with respect to a corresponding reference point on the reference icon 204. The pilot or autopilot must maneuver the aircraft controls to align the reference icon 204 with the pitch and roll cue 203. The exemplary embodiments integrate the display of the collective cue 202 with the reference icon 204 so that the cues for all control axes are displayed in close proximity to the reference icon 204.

Also shown in the display of FIG. 2 is a representation of the external environment including as examples a lake 212, a runway 222 and a perspective view of terrain 214. The display may also include an attitude scale 224, and other typical guidance icons. For simplicity this illustration excludes other symbology typically included on a PFD such as the airspeed, altitude, course indicator and heading indicator.

Both the pitch and collective axes of control can affect the reference icon 204 location in the vertical axis 210 with respect to the reference representation of the external environment. Roll axis of control can affect the reference icon 204 location in the horizontal axis 211 with respect to the representation of the external environment. In operation, the pilot would maneuver the collective and pitch axes of control to align both the collective cue 202 and the pitch cue 203 with the reference icon 204 as the reference icon 204 moves with respect to the representation of the external environment.

If the collective cue 202 is displayed above the reference icon 204, specifically the chevron icon 206, the pilot would move the collective control up to conceptually "pull the flight path up" to match that indicated by the collective cue 202. Conversely, if the collective cue 202 is displayed below the reference icon 204 (as shown), the pilot would push the collective control down to "push the flight down" to match that required by the collective cue 202. Similarly, in the pitch axis, if the pitch cue 203 is above the reference icon 204 (as shown), the pilot would increase the aircraft pitch attitude to satisfy the pitch cue 203. Because the reference icon 204 is a moving reference rather than a fixed reference as in traditional collective cues, the pilot can conceive of both collective and pitch controls being used to control the single integrated reference. Note that the situation depicted in FIG. 2 requires the pilot to push the collective down as well as pitching the helicopter up.

Figure 3:
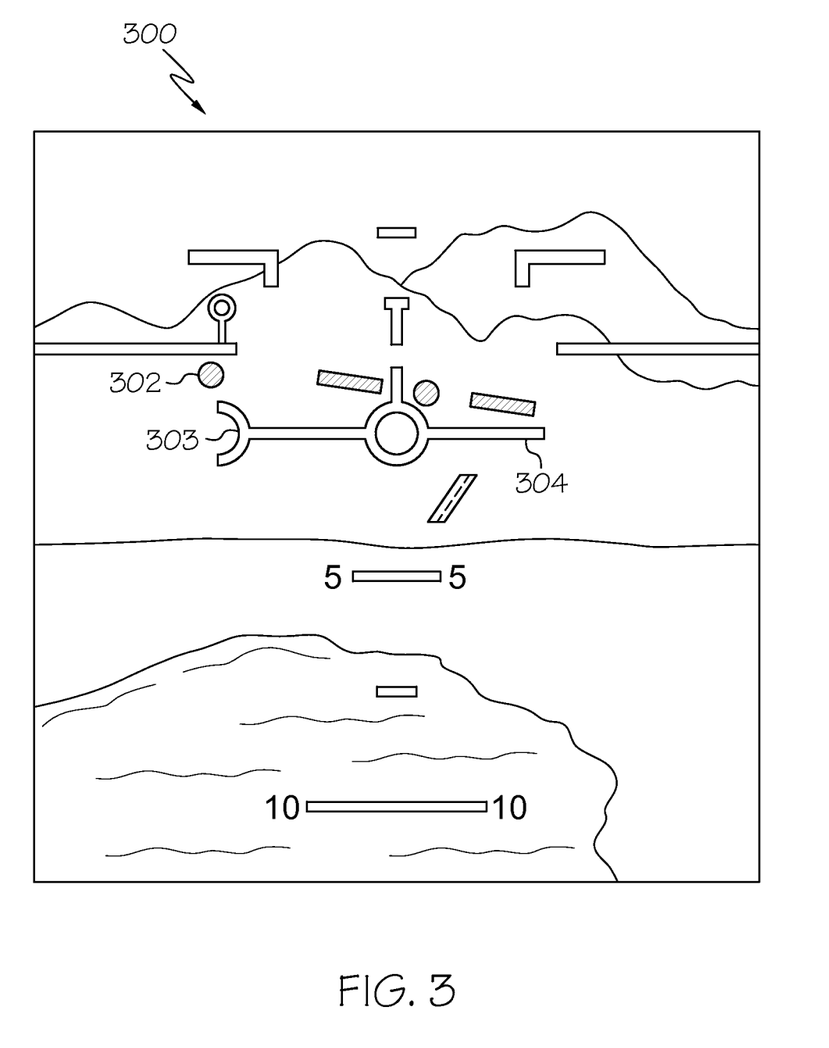
FIG. 3 is a simulated image of the flight environment including cues generated in accordance with a second exemplary embodiment.
Figure 4:
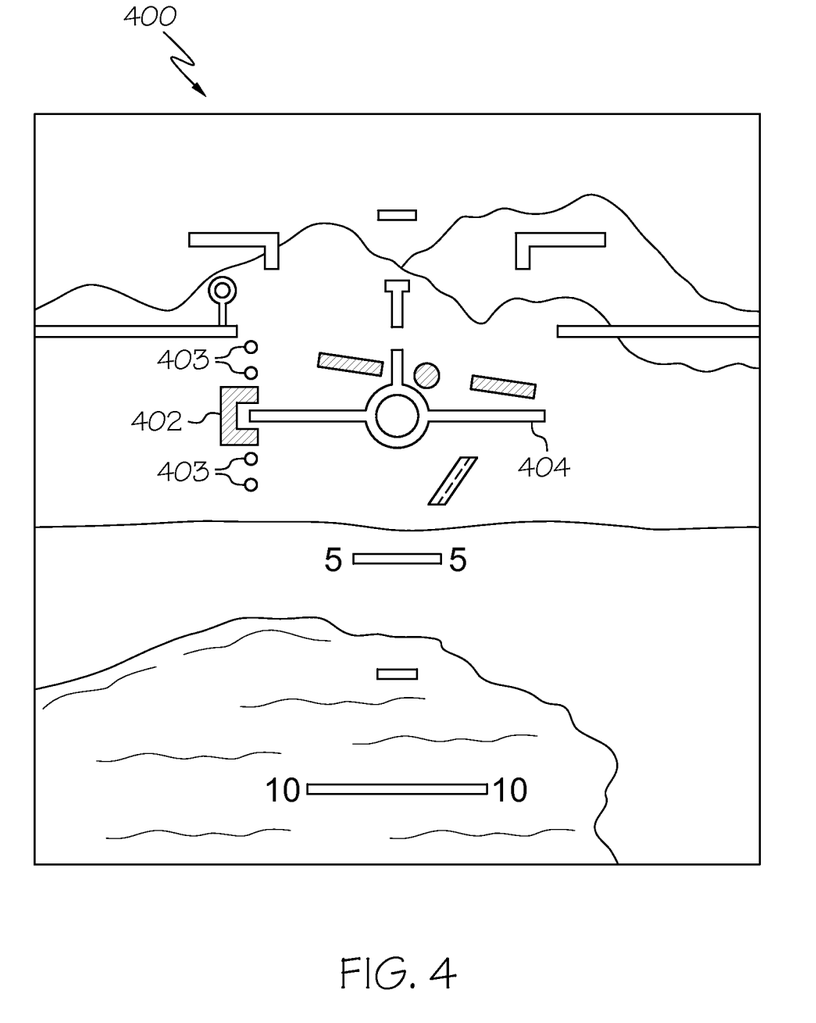
FIG. 4 is a simulated image of the flight environment including cues generated in accordance with a third exemplary embodiment.

FIG. 3 provides an example display 300 showing an alternative exemplary embodiment where the collective cue is rendered as a circle 302 rather than a triangle. This cue is again displayed with reference to the reference icon 304 and half-circle icon 303. FIG. 4 provides yet another embodiment 400 where the cue is displayed as a notched square 402 that must be aligned with the reference icon 404. In this illustrated embodiment, there are also graduation marks 403 shown on the collective scale. If implemented with graduation marks, these marks would also preferably move in concert with the reference icon 404.

Figure 5:
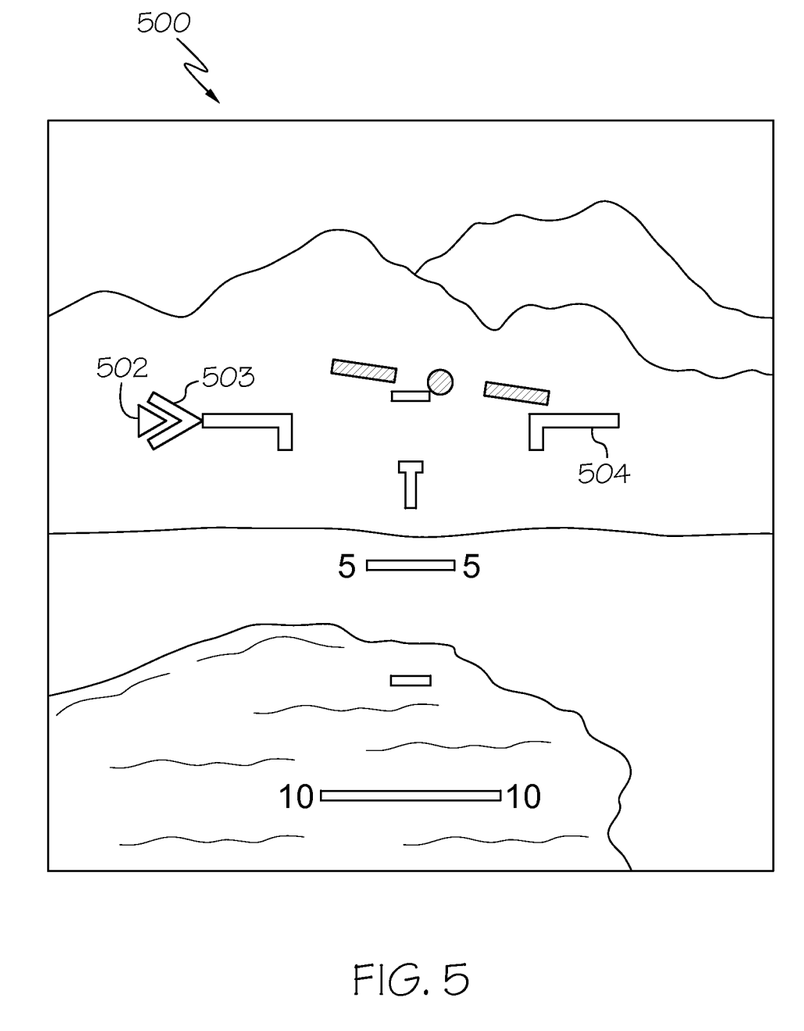
FIG. 5 is a simulated image of the flight environment including cues generated in accordance with a fourth exemplary embodiment.

FIG. 5 provides an exemplary embodiment 500 of the second state wherein the FD cues are referenced to a fixed display reference instead of the moving flight path marker. This can happen when the FPM is invalid, e.g., when the helicopter is at a low airspeed or hovering, or when the user chooses to not reference the FD cues to the FPM. A reference icon 504 is stationary on the display, while the collective cue 502 is being held within the icon 503 by the collective control. In this example, the fixed reference cue is the aircraft symbol.

Figure 6:
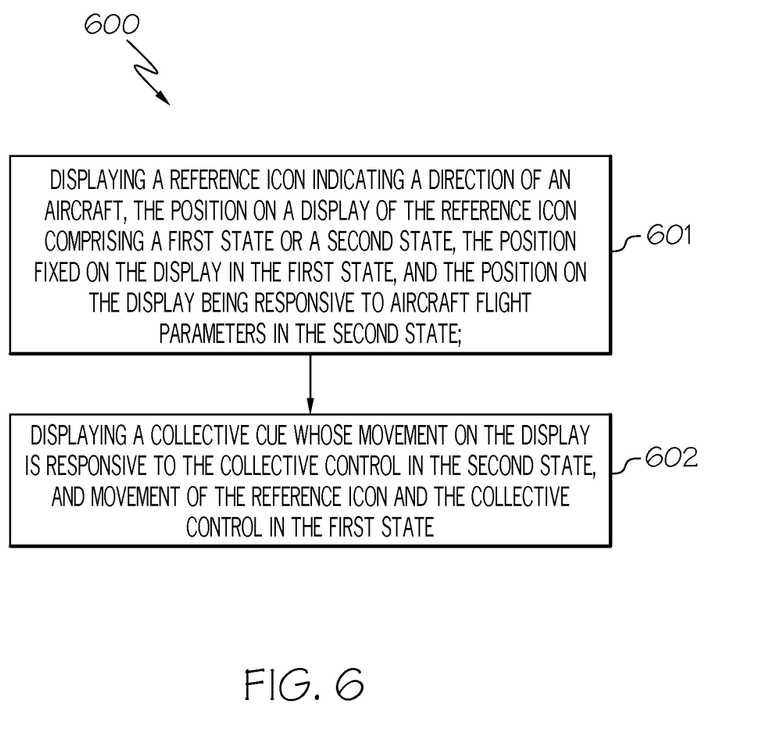
FIG. 6 a flow diagram of an exemplary method suitable for use with the display system of FIG. 1 in accordance with the exemplary embodiments.

FIG. 6 is a flow chart that illustrates an exemplary embodiment of a method 600 suitable for use with a flight deck display system 100. Method 600 represents one implementation of a method for displaying aircraft approaches or departures on an onboard display of a host aircraft. The various tasks performed in connection with method 600 may be performed by software, hardware, firmware, or any combination thereof For illustrative purposes, the following description of method 600 may refer to elements mentioned above in connection with preceding FIGS. In practice, portions of method 600 may be performed by different elements of the described system, e.g., a processor, a display element, or a data communication component. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

In accordance with the exemplary method of FIG. 6, a method for displaying a plurality of icons on a display for an aircraft, the aircraft having flight parameters and a collective control, includes displaying 601 a reference icon indicating a direction of the aircraft, the position on the display of the reference icon comprising a first state or a second state, the position fixed on the display in the second state, and the position on the display being responsive to the aircraft flight parameters in the first state; and displaying 602 a collective cue whose movement on the display is responsive to the collective control in the second state, and movement of the reference icon and the collective control in the first state.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A display for an aircraft, the aircraft having flight parameters and a collective control, the display having a plurality of icons displayed thereon, the icons comprising:
   a reference icon indicating a direction of the aircraft, a position on the display of the reference icon comprising a first state or a second state, the position fixed on the display in the second state, and the position on the display being responsive to the aircraft flight parameters in the first state; and
   a collective cue whose movement on the display is responsive to the collective control in the second state, and movement of the reference icon and the collective control in the first state.

2. The display of claim 1 wherein the icons further comprise:
   a scale affixed to the reference icon and configured to indicate a degree of movement of the collective cue in response to the collective control.

3. The display of claim 1 wherein the reference icon comprises:
   a flight path marker in the first state.

4. The display of claim 3 wherein the first state occurs when the flight path marker is invalid.

5. The display of claim 1 wherein the reference icon comprises:
   an aircraft symbol in the second state.

6. The display of claim 1 wherein the second state occurs when a user chooses to not reference the collective cue to the flight path marker.

7. The display of claim 1 wherein the second state occurs based on the flight parameters including an airspeed of the aircraft dropping below a threshold.

8. The display of claim 7 wherein the reference icon changes in intensity and transparency during a transition between the respective positions of the first and second states.

9. The display of claim 1 wherein the aircraft further comprises a pitch control, and the icons further comprise:
   a pitch cue whose movement on the display is responsive to the pitch control and movement of the reference icon.

10. The display of claim 1 wherein the collective cue is fixed in position relative to the reference icon in the second state when there is no input from the collective control.

11. A method for displaying a plurality of icons on a display for an aircraft, the aircraft having flight parameters and a collective control, comprising:
    displaying a reference icon indicating a direction of the aircraft, a position on the display of the reference icon comprising a first state or a second state, the position fixed on the display in the second state, and the position on the display being responsive to the aircraft flight parameters in the first state; and
    displaying a collective cue whose movement on the display is responsive to the collective control in the second state, and movement of the reference icon and the collective control in the first state.

12. The method of claim 11 further comprising:
    displaying a scale affixed to the reference icon and configured to indicate a degree of movement of the collective cue.

13. The method of claim 11 wherein displaying the reference icon comprises:
    displaying a flight path marker.

14. The method of claim 13 wherein the first state occurs when the flight path marker is invalid.

15. The method of claim 11 wherein displaying the reference icon comprises:
    displaying an aircraft symbol for the first state.

16. The method of claim 11 wherein the reference icon occupies a position on the display determined by a user.

17. The method of claim 11 wherein the aircraft further comprises a pitch control, and the icons further comprise:
    a pitch cue whose movement on the display is responsive to the pitch control and movement of the reference icon.

18. The method of claim 11 wherein the collective cue is fixed in position relative to the reference icon in the first state when there is no input from the collective control.

19. A system for an aircraft, the aircraft having flight parameters and a collective control providing an output, the system comprising:
    a display configured to display both a reference icon and a collective cue, wherein,
        a position on the display of the reference icon comprising a first state or a second state, the position fixed on the display in the second state, and the position on the display being responsive to the aircraft flight parameters in the first state; and
        movement of the collective cue on the display is responsive to the collective control in the second state, and movement of the reference icon and the collective control in the first state.

20. The system of claim 19 wherein the second state occurs based on flight parameters exceeding a threshold or when selected by a user.

* * * * *